Nov. 7, 1939.   S. A. SNELL   2,178,709
VELOCIPEDE STRUCTURE
Original Filed March 22, 1937
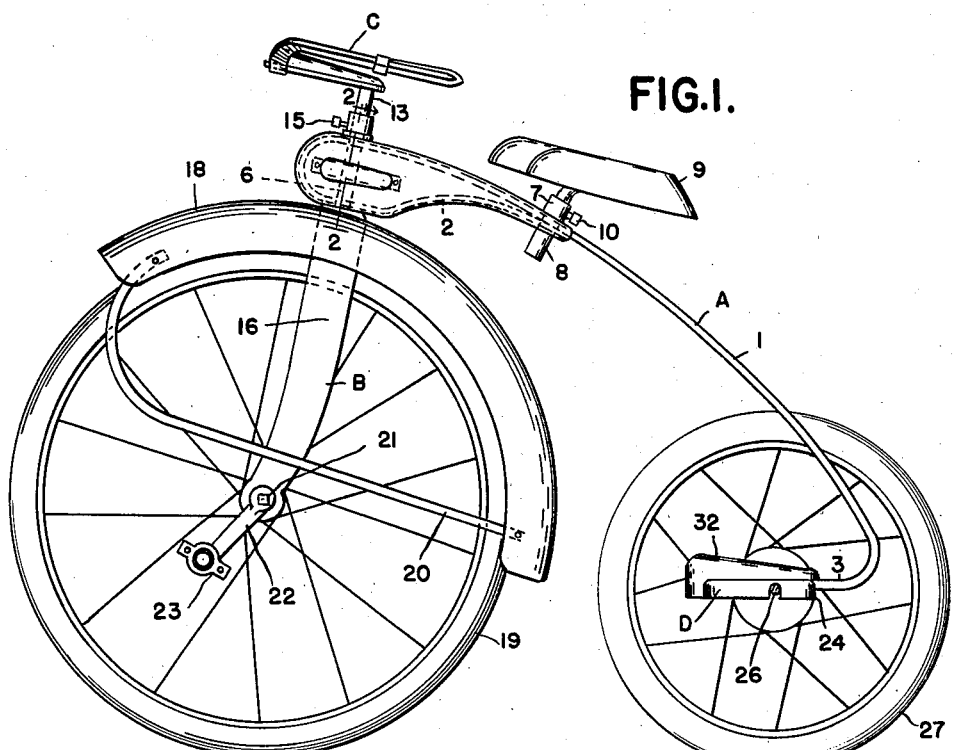
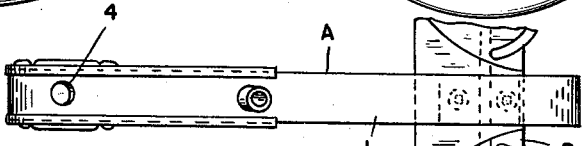
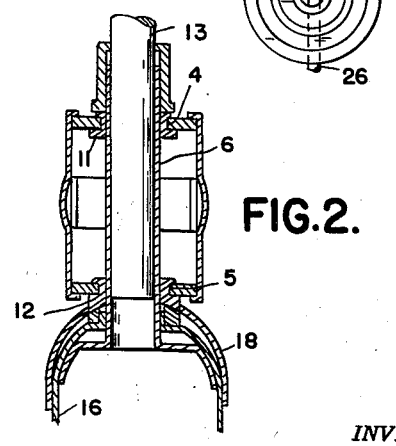
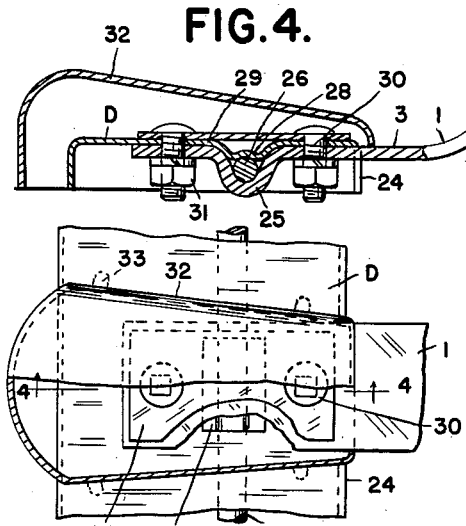
INVENTOR
SAMUEL A. SNELL
BY
*Whittemore, Hulbert & Belknap*
ATTORNEYS Patented Nov. 7, 1939

2,178,709

UNITED STATES PATENT OFFICE 2,178,709

VELOCIPEDE STRUCTURE

Samuel A. Snell, Toledo, Ohio, assignor to The American-National Company, Toledo, Ohio, a corporation of Ohio Original application March 22, 1937, Serial No. 132,415. Divided and this application March 28, 1938, Serial No. 198,509

7 Claims. (Cl. 280—291)

This invention relates generally to juvenile vehicles such as velocipedes and constitutes a division of my application filed March 22, 1937, bearing Serial No. 132,415.

One of the essential objects of the invention is to provide a velocipede wherein the backbone is flexible so that it will materially improve the riding qualities and will effectively cushion the rider from shocks and jars which are ordinarily received from velocipedes of conventional design.

Another object is to provide an improved connection between the backbone and the rear platform and supporting rear axle.

Another object is to provide a velocipede construction that is economical to manufacture, strong and durable in construction, and efficient in operation.

Other objects, advantages and novel details of construction of this invention will be made more apparent as this description proceeds, especially when considered in connection with the accompanying drawing, wherein:

Figure 1 is a fragmentary side elevation of a velocipede embodying my invention;

Figure 2 is a sectional view taken substantially on the line 2—2 of Figure 1;

Figure 3 is a fragmentary top plan view of the backbone, rear platform and rear axle;

Figure 4 is a sectional view taken substantially on the line 4—4 of Figure 5;

Figure 5 is a fragmentary top plan view of the rear platform, cap, and backbone with parts broken away and in section.

Referring now to the drawing, A is the backbone, B is the front fork, C is the handlebar, and D is the rear platform or step of a velocipede embodying my invention. As shown, the backbone A comprises essentially a strip 1 of spring steel having a closed return-bent portion 2 at its forward end and an open return-bent portion 3 at its rear end. Preferably the strip 1 and the closed return-bent portion 2 have vertically aligned openings 4 and 5, respectively, that receive the upstanding shank 6 of the front fork and are rigidly fastened together in rear of said fork by a bushing 7 that receives the supporting post 8 for the seat 9. Any suitable means such as a screw 10 carried by the bushing 7 may be used to hold the seat post 8 in proper position. Bushings 11 and 12 are anchored in the openings 4 and 5, respectively, and form bearings for the shank 6 of the fork. Preferably this shank 6 is tubular in form and receives the depending post 13 of the steering bar. A collar 14 is sleeved upon the post 13 and shank 6 and is fastened thereto by a suitable screw 15.

In the present instance the shank 6 is formed separately from the fork proper 16 and has a flanged portion 17 welded thereto. 18 is a fender for the front wheel 19 mounted on the fork proper 16 and provided upon opposite sides of the fork with suitable braces 20. For propelling the wheel 19, there is an axle 21 journaled in the furcations of the fork B and provided with suitable cranks 22 and pedals 23.

The open return-bent portion 3 of the backbone extends through a depending flange 24 of the rear platform D under the latter and preferably has a substantially U-shaped portion 25 receiving the axle 26 for the rear wheels 27. As shown in Figure 4, a portion 28 of the platform D is crimped down upon the axle 26 in the U-shaped portion 25 and cooperates with the latter to retain the axle. A washer 29 rests upon the platform D over the crimped portion 28, and bolts 30 extend through the washer 29, platform D and return-bent portion 3 of the backbone upon opposite sides of the axle 26 and are engaged beneath the return-bent portion 3 with nuts 31 to firmly hold the parts together. Any suitable means such as the cap 32 may be used to cover the washer 29 and bolts 30. Preferably this cap 32 is formed of sheet metal and has lugs or tongues 33 extending through slots or holes in the platform D and bent laterally with respect thereto so that the cap will be retained in place.

What I claim as my invention is:

1. In a velocipede, a rear platform having depending flanges at opposite ends thereof and having a depending flange at the rear edge thereof, an axle for ground wheels extending through openings in the end flanges of the platform, a backbone having a portion extending through an opening in the flange at the rear edge of the platform and beneath said axle, and connections between said portion of the backbone and the platform in advance and in rear of the axle.

2. In a velocipede, a rear platform having depending flanges at opposite ends thereof and having a depending flange at the rear edge thereof, an axle for ground wheels extending through openings in the end flanges of the platform, a backbone having a portion extending through an opening in the flange at the rear edge of the platform and beneath said platform, said portion having a substantially U-shaped part receiving the axle, and means in front and in rear of said axle securing said portion of the backbone to said platform.

3. In a velocipede, a backbone having a strip of spring steel provided at its rear end with an open return-bent portion, a rear platform on said open return-bent portion, means including bolts fastening the platform to said portion, and a cap fastened to the platform over and concealing said bolts.

4. In a velocipede, a rear platform having a depending flange, a backbone having a portion extending through an opening in said flange and projecting along the underside of said platform in substantially parallel relation thereto, an axle for ground wheels disposed between said parallel parts, and means engaging said parallel parts in advance and in rear of said axle to hold the latter against displacement.

5. In a velocipede, a rear platform having a depending flange, a backbone having a portion extending through an opening in said flange and projecting along the underside of said platform in substantially parallel relation thereto, an axle for ground wheels disposed between said parallel parts, opposed portions of said parallel parts being substantially U-shaped and cooperating with each other to form a collar for said axle, and connections between said parallel parts disposed in front and in rear of said axle operable to hold the latter against displacement from said collar.

6. In a velocipede, a backbone having a strip of spring steel, a metal stamping constituting a rear platform disposed on said strip of steel, means extending through the platform and strip for securing said parts together, and a cap fastened to the platform stamping over and concealing said securing means.

7. In a velocipede, a rear platform, a backbone having a portion extending across the underside of said platform substantially midway its ends, an axle for ground wheels disposed between said portion and platform, and rigid connections between said portion and platform including means extending through said portion and platform in advance and in rear of said axle, opposed parts of said portion and platform being offset downwardly between said connections about said axle to hold the latter against displacement.

SAMUEL A. SNELL.